United States Patent [19]
Miller et al.

[11] Patent Number: 5,532,022
[45] Date of Patent: Jul. 2, 1996

[54] AQUEOUS GEL MATRIX FOR REPLACEMENT OF CONFECTION FATS

[75] Inventors: Mark S. Miller, Arlington Heights; Kevin J. Surber, Lombard, both of Ill.

[73] Assignee: Kraft Foods, Inc., Northfield, Ill.

[21] Appl. No.: 328,392

[22] Filed: Oct. 24, 1994

Related U.S. Application Data

[63] Continuation of Ser. No. 42,990, Apr. 5, 1993, abandoned, which is a continuation-in-part of Ser. No. 869,392, Apr. 16, 1992, abandoned.

[51] Int. Cl.⁶ .................................................. A23G 1/00
[52] U.S. Cl. .................................... 426/660; 426/658
[58] Field of Search .................................. 426/631, 804, 426/660, 607, 548, 659, 658

[56] References Cited

U.S. PATENT DOCUMENTS

| | | | |
|---|---|---|---|
| 3,874,924 | 4/1975 | Sands | 426/660 |
| 3,917,874 | 11/1975 | Sands | 426/659 |
| 4,605,561 | 8/1986 | Lang | 426/93 |
| 4,689,235 | 8/1987 | Barnes | 426/89 |
| 4,832,976 | 5/1989 | Griffin | 426/654 |
| 4,911,937 | 3/1990 | Crosello | 426/660 |
| 5,314,701 | 5/1994 | Mentink | 426/660 |
| 5,376,399 | 12/1994 | Dreese | 426/660 |

OTHER PUBLICATIONS

Alikonis 1979 Candy Technology AVI Publishing Company Inc. Westport CT pp. 134–146.
Maltren Product Bulletin 12281 Muscatine Iowa.

*Primary Examiner*—Carolyn Paden
*Attorney, Agent, or Firm*—Fitch, Even, Tabin & Flannery

[57] ABSTRACT

The present invention is directed to an aqueous gel matrix which replaces triglyceride fat in chocolate and similar confection products. The product is prepared from a mixture including a gelling type maltodextrin, sugar, flavor particles and water. The confection product has a melting temperature of about 140° F., has a firm chocolate-type consistency at temperatures below about 32° F. and has a firmness ranging from that of chocolate sauce to that of butter or margarine at temperatures in the range of from about 32° F. to about 140° F. The melting properties of the low fat confection product of the invention make it particularly suitable for use in frozen dessert products.

35 Claims, 1 Drawing Sheet

AQUEOUS GEL MATRIX FOR REPLACEMENT OF CONFECTION FATS

CROSS REFERENCE TO RELATED APPLICATION

This application is a continuation of U.S. Ser. No. 042,990, filed Apr. 5, 1993, now abandoned which is a continuation-in-part of U.S. Ser. No. 07/869,392, filed Apr. 16, 1992, now abandoned.

FIELD OF THE INVENTION

The present invention relates generally to a low fat chocolate product having the fat mimetic properties of conventional chocolate. More particularly, the present invention is directed to an aqueous gel matrix which has the ability to replace the cocoa butter fraction of chocolate while retaining the mouthfeel properties of fat-containing chocolate under a variety of eating conditions. The product is adapted to be utilized in frozen dessert products or confectionery products at freezing temperatures, and can also be used in baking or confectionery products or as a sauce at ambient temperatures. In another embodiment of the present invention, the aqueous gel matrix is adapted to carry a variety of flavor particles as a replacement for the conventional triglyceride fat carrier of these particles.

BACKGROUND OF THE INVENTION

Chocolate is a highly desirable confection product which has unique texture and flavor release properties in the mouth which are attributable to the fat component of chocolate. Cocoa butter, the fat component of chocolate, has a narrow melting range just slightly below body temperature. Accordingly, the flavor release and desirable organoleptic sensations of chocolate occur rapidly as the chocolate melts in the mouth.

The process for the manufacture of chocolate and cocoa is identical up to the point when chocolate liquor is expressed from the crushed, roasted nibs. At this point, part of the cocoa butter is removed from some of the cocoa liquor to produce cocoa and the removed cocoa butter is added to other chocolate liquor, which in turn, becomes the bitter chocolate known as baking chocolate.

In the manufacture of chocolate and cocoa, cocoa beans are first subjected to fermentation and roasting prior to removing the shell from the nib through winnowing. The roasted nibs are ground at a temperature above the melting point of the cocoa butter constituent (93° F.–95° F.) to produce a dark brown liquid called liquor, mass, or unsweetened chocolate. To manufacture cocoa powder, liquor is subjected to hydraulic pressing, which separates some of the cocoa butter from the solid cocoa mass. Commercial cocoa powders may have a residual cocoa butter content of 10–22%. Dark, bitter or sweet chocolate is manufactured from liquor, sugar and added cocoa butter, the cocoa butter being obtained from cocoa powder manufacture. Milk chocolate is made from liquor, sugar, milk solids and cocoa butter. The milk solids are derived from liquid milk, usually by a spray drying process. Another milk product often used, called milk crumb, is prepared by concentrating and drying liquid milk in the presence of sugar and liquor. The mixture of chocolate components is then subjected to refining, conching and tempering steps to produce the chocolate product having from about 30% to about 34% cocoa butter. Chocolate is a fat (cocoa butter) continuous matrix with embedded particles of cocoa).

Due to the recent dietary emphasis in reducing the intake of saturated fats in the diet, it would be highly desirable to produce a confection product having reduced levels of fat which retains the unique organoleptic and mouthfeel properties of chocolate, due to the melting properties of cocoa butter.

Accordingly, it is a principal object of the present invention to provide a chocolate product having less than about 15% fat.

SUMMARY OF THE INVENTION

Figure 1:
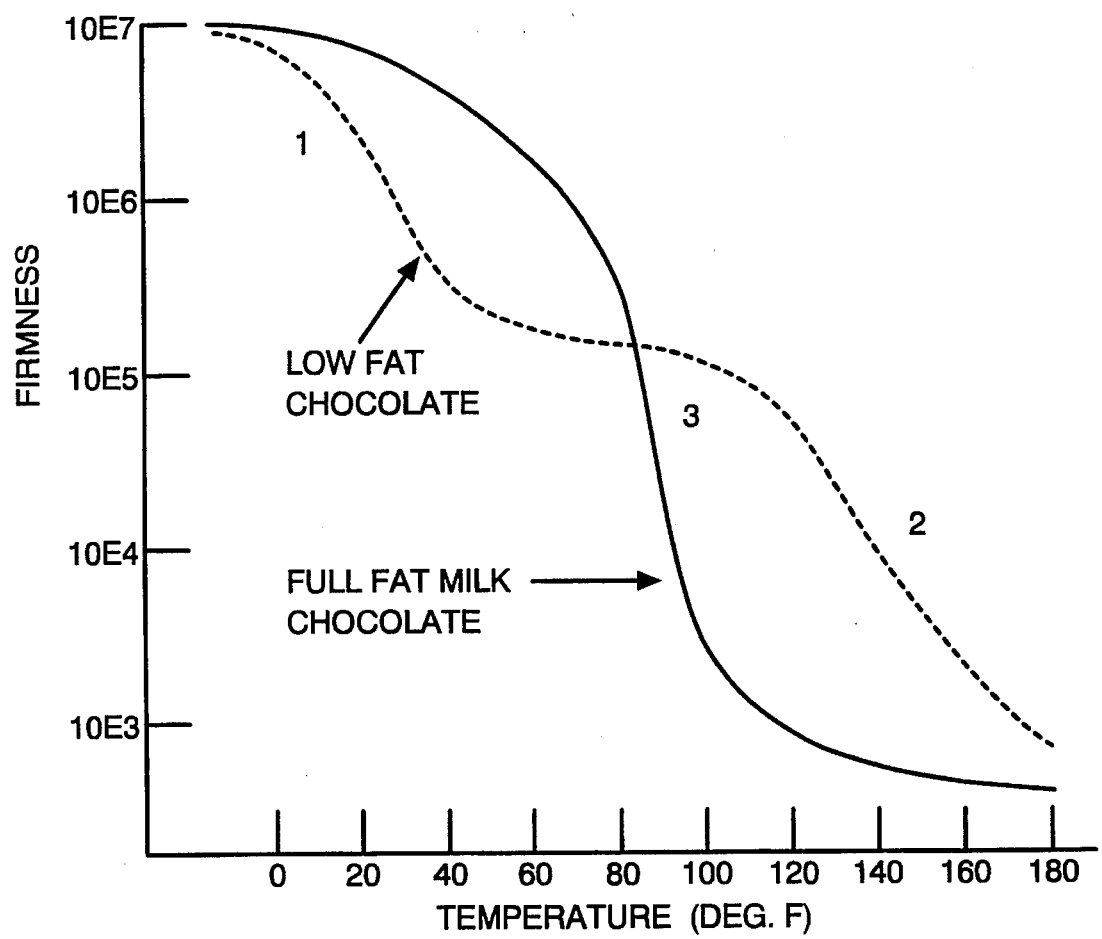
FIG. 1 is a plot of the firmness of chocolate at various temperatures compared to the firmness of a low fat chocolate product of the invention at the same temperatures.

The present invention is directed to an aqueous gel matrix which replaces triglyceride fat in chocolate and similar confection products. The product is prepared from a mixture including a gelling type maltodextrin, sugar, flavor particles and water. The confection product has a melting temperature of about 140° F., has a firm chocolate-type consistency at temperatures below about 32° F. and has a firmness ranging from that of chocolate sauce to that of butter or margarine at temperatures in the range of from about 32° F. to about 140° F. The melting properties of the low fat confection product of the invention make it particularly suitable for use in frozen dessert products.

The low fat confection product of the invention is an aqueous gel matrix having cocoa or other flavor particles embedded therein. The confection product mimics the physical properties of conventional chocolate and other confection products which are typically characterized by having a continuous phase consisting of cocoa butter or other confectionery hard fat.

DETAILED DESCRIPTION OF THE INVENTION

In general, the present invention is directed to a low fat confection product wherein the fat mimetic and chocolate type melting properties are provided through use of a gelling type maltodextrin. Maltodextrins are carbohydrate oligomers produced from a controlled enzymatic and/or acid hydrolysis of a starch. The dextrose equivalent (D.E.) of maltodextrins is very low and is generally in the range of from 1 to 20. Maltodextrins may be characterized as gelling types and as non-gelling types. The maltodextrins useful in the present invention are gelling type maltodextrins. Maltodextrins are manufactured by a process which is substantially the same as that used in the production of corn syrup, except that hydrolysis is controlled to keep the D.E. below 20. Hydrolysis can be catalyzed by use of an acid (usually HCl) or an enzyme (e.g., α-amylase). Some hydrolysis schemes use both acid- and enzyme-catalyzed hydrolysis. The maltodextrin may be chemically modified by the processes used to modify starch. The maltodextrin is used in the confection products of the present invention at a level of from about 8% to about 22%, preferably at a level of from about 12% to about 17%. All percentages used herein are by weight based on the weight of the confection product unless otherwise indicated.

The maltodextrin is blended with water and sugar to provide a mixture which is an aqueous gel matrix precursor. The water and sugar are present in the mixture at levels such that the sugar is dissolved in the water and does not crystallize during subsequent processing. The ratio of water to sugar is preferably in the range of from about 1:1 to about 3:1. The mixture is then heated to a temperature that is sufficient to hydrate and activate the maltodextrin.

Flavor particles are then dispersed throughout the heated mixture by adding the particles and agitating the mixture. The flavor particles are used in the confection products of the invention at a level of from about 5% to about 20%. The flavor particles have a particle size sufficiently small that there is no perception of graininess or gritty feeling when the confection is consumed. In general, the particle size should be less than about 50 microns. Flavor particles in the range of from about 1 micron to about 50 microns are suitable. Commercially available cocoa powder to provide a chocolate type confection product has a suitable particle size. Other suitable flavor particles include ground caramelized sugar to provide a caramel flavor, ground peanut brittle and ground toffee.

The mixture with dispersed flavor particles is then cooled to provide a confection product which is an aqueous gel matrix with flavor particles dispersed throughout. The confection product has a melting temperature of about 140° F., has a firm chocolate-type consistency at temperatures below about 32° F. and has a firmness ranging from that of chocolate sauce to that of butter or margarine at temperatures in the range of from about 32° F. to about 140° F. The confection product of the invention has a continuous aqueous phase surrounding a flavor particle and has the organoleptic and mouthfeel properties of chocolate, but has significantly lower levels of fat than chocolate. The confection product of the present invention is distinguishable from chocolate, which is a fat continuous confection having from about 30% to about 34% of cocoa butter. The confection product of the present invention is also distinguishable from a fondant, such as that described in U.S. Pat. No. 4,605,561 to Lang, which generally has less than about 15% water. A fondant consists of a mass of sugar crystals dispersed in a saturated sugar solution.

A chocolate flavor is provided by the use of cocoa. The cocoa may be fully defatted, having less than about 1% fat, or may be the full fat cocoa having from about 10% to about 20% cocoa butter or may be partially defatted having from about 1% to about 10% of cocoa butter. The cocoa is used in the chocolate confection of the invention at a level of from about 5% to about 20%. When defatted cocoa having less than about 1% cocoa butter is used, it is apparent that the fat level of the finished chocolate product at the highest level of use of the cocoa in the chocolate product will be not more than about 0.2%, provided that no other fat source is present in the chocolate product.

Sugar (sucrose) is present in the low fat chocolate product of the present invention at a level of from about 20% to about 32%. The sugar may be granular cane or beet sugar. For some applications, a portion of the sugar may be powdered confectioners sugar. Powdered confectioners sugar is generally used at a level of from about 3% to about 10%.

Other nutritive sweeteners, such as glucose, corn syrup and high fructose corn syrup may also be used at equivalent levels or as a substitute for a portion of the sugar.

Non-nutritive (artificial) sweeteners such as aspartame, Sucralose™ or Alitame™ may be used in combination with a bulking agent such as polydextrose. Other sweeteners, such as D-tagatose or various polyols (e.g., sorbitol, xylitol) may be used with or without bulking agents to substitute for all or part of the sugar.

A polydextrose may optionally be present in the low fat confection products of the invention. Polydextrose is prepared through the polymerization of glucose in the presence of food-acceptable polycarboxylic acid catalysts and polyols. One method for preparation of polydextrose is described in U.S. Pat. No. 4,622,233 to Torres. The polydextrose may be used to replace all or a part of the sugar to provide altered textural characteristics. The sweetening effect of the displaced sugar is provided by use of one or more of the non-nutritive sweeteners. The polydextrose is used at levels of from 0 to about 23%.

Some fat may be provided in the low fat chocolate products of the invention in addition to the fat contained in the cocoa. The fat is generally added at a level of from about 1% to about 10%, so long as the total fat in the low fat confection product is less than about 15%. The added fat should generally have the melting properties of cocoa butter in a melting transition at a temperature slightly below body temperature. A preferred fat is the margarine oil used in the preparation of margarine products, butter or cocoa butter. Alternatively, a fat substitute such as polyol polyesters preferably sucrose polyester, may be used in place of triglyceride fat.

Added water, other than the moisture present in the dry components, is present at a level of from about 30% to about 60%.

Color enhancing substances, such as titanium dioxide, may also optionally be present in the low fat chocolate product. If used, titanium dioxide is present at a low level of from about 0.1% to about 0.5%. Alternate whitening agents, such as tricalcium citrate may also be used at levels of from about 0.5% to about 3.0%.

Tricalcium citrate, such as that described in U.S. Pat. No. 5,149,552 can also be used at higher levels of from about 8% to about 12% to restrict the melting properties of the confection product. At these higher levels of tricalcium citrate, the confection products of the invention do not melt when exposed to heating in a conventional or microwave oven. This is a distinct advantage for use of the confection products in bakery products which are intended to be heated.

The low fat confection product of the invention is prepared by combining the maltodextrins, sugar and water and heating the mixture with continuous stirring to a temperature in the range of from about 180° F. to about 200° F. The heating is continued at the elevated temperature for a period of from about 10 to about 30 minutes or for a period sufficient to solubilize the maltodextrin. The flavor particles and fat (if used) is then blended into the mixture. Preferably, the mixture is cooled to a temperature in the range of from about 150° F. to about 165° F. prior to adding cocoa as a flavor particle. After the flavor particle has been homogeneously blended into the mixture, the blend is immediately withdrawn from the heat source and packaged into suitable containers. It should be pointed out that the method of the present invention for preparing the low fat confection product is contrary to and substantially simpler than the instructions provided by the manufacturer of one source of a gelling maltodextrin prepared from corn starch which is useful in the practice of the present invention. Stellar™, maltodextrin, manufactured by Staley Manufacturing Company, is known for use as a fat replacer in some food products in the form of a cream. The creme is prepared by dispersing the maltodextrin into water to provide an aqueous slurry of the maltodextrin having 20% to 25% solids. The slurry is then subjected to high energy shear processing to disrupt the crystallite structure of the maltodextrin and produce a loosely associated network of sub-micron particles in structured water layers which has the appearance of milk fat cream. The literature also indicates that the cream and the maltodextrin should not be subjected to temperatures in excess of about 160° F.

Melting curves of a low fat chocolate confection product of the invention and full fat chocolate are shown in FIG. 1. Firmness of a low fat chocolate confection product prepared according to the present invention and described more fully in Example 2 was compared with that of a commercially available full fat milk chocolate (Milka™, Jacobs Suchard, Neuchatel). Firmness was measured as storage modulus (G', dyn/cm$^2$) using a Rheometrics mechanical spectrometer as the temperature was increased from 0° to 180° F. The lines are an interpolation of data taken from several samples.

The three thermal states of low fat chocolate (firm when frozen, semi-soft at room temperature and fluid when melted) are clearly illustrated by this FIGURE. The low fat chocolate product has two melting transitions: a sharp transition between −15° and 32° F. (labeled 1 in FIG. 1) and a broad transition covering the range of 120°–180° F. (labeled 2 in FIG. 1). Transition 1 is due to melting of ice, while transition 2 represents melting of the maltodextrin gel.

Note that the firmness of milk chocolate at room temperature is similar to that of the frozen low chocolate product. The low fat chocolate product achieves an intermediate firmness at room temperature, and after the second melting transition is similar to molten milk chocolate. Milk chocolate melts with a sharp transition at around 85° F. (labeled 3 in FIG. 1) which represents the melting of cocoa butter.

The following examples further illustrate various features of the invention, but are intended to in no way limit the scope of the invention as set forth in the appended claims.

EXAMPLE 1

A typical example of a low fat chocolate confection product of the present invention was prepared having the formulation indicated hereinbelow in Table 1.

TABLE 1

| Ingredient | Sample Number MM1015-6 | |
|---|---|---|
| | Percent | Weight (g) |
| Maltodextrin[1] | 15.0 | 30.0 |
| Sugar | 25.0 | 50.0 |
| Hydrogenated Soybean Oil | 2.0 | 4.0 |
| Titanium Dioxide | 0.5 | 1.0 |
| Cocoa[2] | 10.0 | 20.0 |
| Water | 47.5 | 95.0 |
| Total | 100.0 | 200.0 |

[1]Stellar ™, manufactured by A. E. Staley Manufacturing Co., Decatur, IL
[2]Low Fat Cocoa Powder, Dutch Process, Type S manufactured by Cocoa De Zaan b.v., Holland This example was prepared by combining the maltodextrin, sugar, titanium dioxide and water and heating with mixing to a temperature of 190° F. on a hot plate. The heating was continued in a 190° F. water bath for 20 minutes. The mixture was removed from the water bath and allowed to cool to 160° F. The cocoa and oil was blended into the mixture with sufficient stirring to ensure complete dispersion of the cocoa. The flowable liquid was poured into covered dishes and allowed to cool to 35° F. The mixture was slowly set up under refrigeration to a final smooth, creamy butter-like texture.

The sample was found to be very moist with excellent flavor release properties. It had fudge-like texture but with much smoother consistency. The mouthfeel properties of the sample simulated the melting characteristics of softened chocolate.

The sample MM1015-6 was cut into cubic pieces approximating 0.5 cm on each side. These low fat chocolate chips were frozen at 0° F. The mouthfeel properties of the frozen sample simulated the rapid melting characteristic of milk chocolate. This example was found to be highly useful for use as a chocolate chip in ice cream.

EXAMPLE 2

Four samples of the low fat chocolate of the present invention were prepared using different maltodextrins or modified food starches, to illustrate the variety of textures which are possible within this same basic ingredient line. These are illustrated below in Table 2.

TABLE 2

| Ingredient | MM1113-2 Wt. (g) | MM1113-3 Wt. (g) | MM1113-4 Wt. (g) | MM1206-2 Wt. (g) |
|---|---|---|---|---|
| Paselli SA-2[1] | 45 | 0 | 0 | 0 |
| N-Lite L[2] | 0 | 45 | 0 | 0 |
| Maltrin M040[3] | 0 | 0 | 45 | 0 |
| Rice*Trin 3DE[5] | 0 | 0 | 0 | 30 |
| Sugar | 75 | 75 | 75 | 75 |
| Hydrogenated Oil | 6 | 6 | 6 | 6 |
| TiO$_2$ | 1.5 | 1.5 | 1.5 | 1.5 |
| Cocoa[4] | 30 | 30 | 30 | 30 |
| Water | 142.5 | 142.5 | 142.5 | 157.5 |

[1]Paselli SA-2 ™, manufactured by Avebe America Inc., Princeton, NJ
[2]N-Lite L ™, manufactured by National Starch and Chemical Co., Bridgewater, NJ
[3]Maltrin M040 ™, manufactured by Grain Processing Corporation, Muscatine, IA
[4]Low Fat Cocoa Powder, Dutch Process, Type S, manufactured by Cocoa de Zaan, b.v., Holland
[5]Rice*Trin 3DE ™, manufactured by Zumbro, Inc., Minnesota The ingredients were processed as described in Example 1. Sample MM1113-2, made with the potato maltodextrin, Paselli SA-2, was very similar at refrigerated and ambient temperatures to the product described in Example 1. At ambient temperature, MM1113-2 was a firm, smooth gel with a clean flavor profile. It had slightly less body than Example 1. Upon heating above 160° F., MM1113-2 had a low viscosity, similar to a thin chocolate sauce. This contrasts with the product of Example 1, which formed a thick fudge sauce consistency upon heating. The sample MM1113-2 is suitable either as a frozen chip for ice cream or as a thin coating for frozen ice cream novelties.

Sample MM1113-3, made with the modified maltodextrin, N-Lite L™, did not set up as a gel upon cooling, but remained as a viscous, creamy, rich fudge sauce. This product is suitable for ice cream toppings or for coating frozen novelties and ready-to-eat sundaes.

Sample MM1113-4, made with corn maltodextrin, Maltrin™ MO40, was a very soft and moist gel, with good creamy texture and clean flavor. It is suitable for topping sundaes or for use as a pumpable variegating sauce for fudge swirl ice cream.

Sample MM1206-2, made with rice maltodextrin, Rice*Trin™ 3DE, was very pudding-like in consistency. That is, the texture was typical of that of a starch gel. The most noticeable organoleptic difference between sample MM1206-2 and the sample cited in Example 1 or the other samples of Example 2 is the lack of the dense heavy richness which simulates the mouthfeel of melted chocolate.

EXAMPLE 3

Four samples of the low fat chocolate of the present invention were prepared using a variety of optional ingredients to illustrate the spectrum of organoleptic properties possible with slight modification to the ingredient line. These are illustrated below in Table 3.

TABLE 3

| Ingredient | MM1015-5 Wt. (g) | MM1018-4 Wt. (g) | MM1028-2 Wt. (g) | MM1028-5 Wt. (g) |
| --- | --- | --- | --- | --- |
| Stellar ™ | 40 | 15 | 30 | 30 |
| Sugar | 40 | 50 | 50 | 54 |
| Hydrogenated Oil | 4 | 4 | 4 | 0 |
| TiO$_2$ | 0.2 | 1 | 1 | 1 |
| Cocoa | 20 | 20 | 20 | 20 |
| Carrageenan[1] | 2 | 0 | 0 | 0 |
| Polydextrose[2] | 0 | 20 | 0 | 0 |
| Paselli SA-2 ™ | 0 | 15 | 0 | 0 |
| Powdered Sugar | 0 | 0 | 16 | 0 |
| Water | 93.8 | 75 | 75 | 95 |

[1]Carrageenan, Viscarin ™ GP-109, manufactured by FMC Corporation, Marine Colloids Division, Philadelphia, PA
[2]Litesse ™, manufactured by Pfizer, Inc., Specialty Chemicals Group, NY All of the above sample products were processed as described in Example 1. Sample MM1015-5 illustrates the effect of gums, and the whitening effect of TiO$_2$. The sample was very chewy, more like taffy candy than chocolate. It did not simulate the mouthfeel and melting characteristics of chocolate. Furthermore, the sample, which contained the lowest recommended level of TiO$_2$, was very dark, almost black in color, like the color of unsweetened chocolate.

Sample MM1018-4 illustrates the effect of increased solids, added in the form of polydextrose. The added water in this sample was 37.5%, compared with 47.5% in the samples of Examples 1 and 2. MM1018-4 was very uniform and shiny in consistency, and very firm and difficult to cut. Its mouthfeel properties were very dry, gummy, chewy and with poor melting characteristics. It had properties more similar to a caramel-type candy. In the frozen state, this product did not firm up as the samples in Examples 1 and 2, but remained chewy.

Sample MM1018-2 illustrates the effect of increased solids, using powdered sugar and additional cocoa powder to increase solids instead of polydextrose. The added water in this sample was the same as in MM1018-4 (i.e., 37.5%). The molten sample was very viscous and difficult to pour. Although it was firmer than that cited in Example 1, it was not gummy and chewy like sample MM1018-4. This formulation is suitable for baking chip applications and for enrobing frozen confections.

Sample MM1028-5 illustrates the effect of low levels of fat in the product. The formulation is the same as that of Example 1, except that 2% sugar was substituted for the 2% hydrogenated fat. The product was shinier on the surface than was the product of Example 1, but the textural properties were otherwise indistinguishable from those of Example 1. The flavor was not as rich as that of Example 1.

EXAMPLE 4

Ready-to-eat fat free fudge sundaes were prepared using low fat chocolate as follows. Low fat chocolate was made as described in Example 1 and cooled to about 130° F. The soft low fat chocolate sauce was poured over Sealtest™ brand fat free vanilla frozen yogurt, which had been previously scooped out into 8 oz. plastic cups and hardened at −20° F. The amount of chocolate was approximately 10% of that of the frozen yogurt. The cups were capped and returned to the −20° F. freezer for tempering overnight. The sundaes were stored at 0° F. prior to eating. The sundaes were tested both directly from the freezer as a ready-to-eat product or else after microwaving them for 10 seconds. This particular example functioned better as a ready-to-eat sundae. The yogurt portion of the microwaved sundae softened slightly more than the fudge sauce, leading to a runny product.

EXAMPLE 5

A variety of confections were prepared from low fat chocolate for frozen or ambient temperature consumption. In this example, frozen confections were made using two low moisture versions of low fat chocolate coated with a commercial chocolate coating mixture designed for enrobing ice cream novelties. Low fat chocolate was prepared according to the formulations in Table 4.

TABLE 4

| Ingredient | MM1216-1 Wt. (g) | MM1216-2 Wt. (g) |
| --- | --- | --- |
| Paselli SA-2[1] | 67.5 | 0 |
| Maltrin M040[2] | 0 | 75 |
| Stardri 10[3] | 35 | 17.5 |
| Sugar | 150 | 150 |
| Hydrogenated Fat | 10 | 10 |
| TiO$_2$ | 2.5 | 2.5 |
| Cocoa[4] | 70 | 70 |
| Water | 165 | 165 |

[1]Paselli SA-2 ™, manufactured by Avebe America Inc, Princeton, NJ
[2]Maltrin M040 ™, manufactured by Grain Processing Corporation, Muscatine, IA
[3]Stardri 10 maltodextrin (10 DE), manufactured by A. E. Staley Manufacturing Co., Decatur, IL
[4]Low Fat Cocoa Powder, Dutch Process, Type S manufactured by Cocoa De Zaan b.v., Holland These ingredients were processed as described in Example 1. Both of these versions were designed to be high solids, low moisture products. MM1216-1 has 33% added water, MM1216-2 has 35% added water. Both of these products were very soft and creamy, with excellent flavor release and smooth melt in the mouth. Sample MM1216-1 was firmer than MM1216-2.

To make the confections, 1 cm cubes were cut from sample MM1216-1 and 1 cm diameter balls were rolled from MM1216-2, which were then coated with cornstarch to prevent sticking. These were dipped into Crystal Dark™ Ice Cream Coating, manufactured by the Guittard Corporation, Burlingame, Calif., which had been melted and held at 100° F. prior to coating. All confections were frozen in individual paper petit four cups.

The chocolate ice cream coating formed a thin chocolate shell on the low fat centers. MM1216-1 was firm enough to retain its shape during coating, while MM1216-2 softened and formed a flattened disc during cooling. Both were highly acceptable as frozen confections, with MM1216-1 exhibiting a chewy texture, and MM1216-2 being very smooth with chocolate-like melting characteristics.

The ratio of coating to center was estimated to be about 10:90. At this ratio, the fat reduction was 84% and the calorie reduction was 48% compared with a full fat chocolate containing 30% cocoa butter.

EXAMPLE 6

Confections, designed for consumption at ambient temperature were made using low fat chocolate as described in Example 1. Small balls (1 cm diameter) or bars (1×2×0.3 cm) were prepared from the low fat chocolate, coated with cornstarch and frozen on dry ice. These were coated with Solitare™ semisweet chocolate, made by the Guittard Corporation, which had been heated to 130° F. and then cooled to 100° F. prior to coating. The bar shape was especially well accepted by the evaluators, demonstrating good adhesion between the coating and the filling. This product represented a 53% fat reduction and a 35% calorie reduction compared with a 30% cocoa butter chocolate.

EXAMPLE 7

Low fat peanut butter cups were prepared using low fat chocolate and fat reduced peanut butter as follows. Low fat chocolate was made as described in Example 3, sample MM1028-2. Prior to making the low fat chocolate, 1 cm diameter balls had been made from 65% reduced fat peanut spread containing 12.5% fat. These peanut butter balls had been frozen on dry ice. The frozen peanut butter balls were dipped into the molten low fat chocolate and chilled under refrigeration to 35° F. After tempering overnight under refrigeration, the reduced fat peanut butter cups were evaluated. The cut surface exhibited a shiny, smooth surface with good definition between peanut butter and chocolate. The texture was chewy and rich, with strong peanut and chocolate flavors. The texture is too soft to be recommended for a candy bar, but is suitable for a frozen confection.

Frozen low fat peanut butter cups were made as follows. Low fat chocolate was prepared as described in Example 1. This was held at 160° F. until the centers were ready for coating. The peanut butter centers were prepared using 85% reduced fat peanut spread containing 7.5% fat. Small balls (1 cm dia.) were prepared and rolled in corn starch to prevent sticking. They were frozen on dry ice and dipped in the molten low fat chocolate. The peanut butter cups were tempered at 35° F. overnight prior to freezing at 0° F. The texture of these confections was very acceptable eaten directly from the freezer. These low fat confections had approximately 90% less fat and 60% fewer calorie than their full fat peanut butter cup counterparts.

EXAMPLE 8

Fat free chocolate chip ice cream was prepared using low fat chocolate and a fat free ice cream mix. The chocolate chips were made according to the following procedure. Low fat chocolate, prepared according to Example 1, was allowed to firm up in 8 oz. plastic bowls. The blocks of low fat chocolate were unmolded from the bowls and cut into 0.5 cm thick slabs using a wire-type cheese cutter. These slabs were extruded through an aluminum mesh with approximately 0.5 cm openings. The chips were frozen at −40° F. until solid and then broken apart with repeated hammer blows while still frozen. The chips were kept frozen at −40° F. or on dry ice until ready for use.

Vanilla flavored fat free ice cream mix was frozen using a commercial pilot plant ice cream freezer (Crepaco). As the frozen mix emerged, frozen chocolate chips were incorporated by manually feeding them through a fruit feeder attachment. This resulted in uniform distribution of chips throughout the ice cream. The fat free chocolate chip ice cream was hardened at −20° F. overnight and tempered at 0° F. prior to evaluation. The product was acceptable, although the chips themselves were not as hard as full fat chocolate chips. The texture of the melted chips was smooth, with none of the waxiness sometimes associated with full fat chips in ice cream.

EXAMPLE 9

Fat free chocolate variegating sauce for ice cream was made according to the formulation indicate hereinbelow in Table 5.

TABLE 5

| Ingredient | Sample Number MM0129-1 | |
|---|---|---|
| | Percent | Weight (lbs) |
| Maltodextrin[1] | 5.0 | 2.5 |
| Maltodextrin[2] | 4.0 | 2.0 |
| Sugar | 25.0 | 12.5 |
| $TiO_2$ | 0.3 | 0.15 |
| Cocoa[3] | 10.0 | 5.0 |
| Vanilla Extract | 0.1 | 0.05 |
| Water | 55.6 | 27.8 |

[1] Stellar ™, manufactured by A. E. Staley Manufacturing Co., Decatur, IL
[2] N-Lite LP ™, manufactured by National Starch and Chemical Co., Bridgewater, NJ
[3] Low Fat Cocoa Powder, Dutch Process, Type S manufactured by Cocoa De Zaan b.v., Holland These ingredients were processed in the pilot plant as follows. The maltodextrin and water were heated to 190° F. in a stirred, steam jacketed kettle (Groen). Mixing was continued at 190° F. until the maltodextrins were completely dissolved. The mixture was cooled to 160° F. and the other ingredients were mixed in. Mixing was continued until the cocoa powder was uniformly dispersed. The product was cooled to 110° F. and poured into covered plastic buckets and stored under refrigeration.

Sample MM0129-1 was used to make fat free fudge variegated ice cream. Vanilla flavored fat free ice cream mix was frozen using a commercial pilot plant ice cream freezer (Crepaco). The frozen mix was pumped through a commercial ice cream variegator, which was calibrated to deliver 20 parts variegating sauce to 80 parts fat free ice cream mix. The sauce was distributed in 1–2 mm bands throughout the ice cream. The fat free fudge variegated ice cream was hardened at −20° F. overnight and tempered at 0° F. prior to evaluation.

Sample MM0129-1 was made without added fat and contained only 0.13% fat which came from defatted cocoa powder. The amount of variegating sauce added to the ice cream could be varied infinitely without adding a significant amount of fat to the mix. The fat free fudge variegated ice cream made with 20% MM0129-1 had a rich fudge flavor and mouthfeel. The texture of the frozen variegate was slightly chewy and had a mouthcoating quality associated with fudge sauces which contain much higher levels of fat.

EXAMPLE 10

Low fat chocolate of the present invention was used to prepare fat free chocolate covered frozen ice cream novelty bars. The low fat chocolate coating was formulated using a two part system: one part contained a gelling maltodextrin; the other part contained a non-gelling fat mimetic starch. Both parts were prepared separately, given sufficient time for starch or maltodextrin network development and combined prior to coating. The formulations of the two parts of the system are given below in Table 6.

TABLE 6

| Ingredient | MM0210-1 Wt. (g) | MM0210-2 Wt. (g) |
|---|---|---|
| Maltodextrin[1] | 0 | 225 |
| Maltodextrin[2] | 180 | 0 |
| Sugar | 450 | 375 |
| Hydrogenated Fat | 15 | 30 |
| $TiO_2$ | 7.5 | 7.5 |
| Cocoa[3] | 150 | 150 |
| Water | 697.5 | 712.5 |

[1] Stellar ™, manufactured by A. E. Staley Manufacturing Co., Decatur, IL
[2] N-Lite LP ™, manufactured by National Starch and Chemical Co., Bridgewater, NJ
[3] Low Fat Cocoa Powder, Dutch Process, Type S manufactured by Cocoa De Zaan b.v., Holland The ingredients were processed as described in Example 1, except that the maltodextrins were completely hydrated by stirring and heating to 190° F. before the sugar was added. Both samples were completely cooled to 35° F. by overnight refrigeration before proceeding with the coating procedure. Sample MM0210-2 is the same formula as Example 1, and formed a smooth firm gel after refrigeration. Sample MM0210-1 was similar to MM1113-2 in Example 2. It remained fluid, although very viscous and cohesive.

The coating mixture was prepared by melting MM0210-2 in a microwave oven until fluid, and then combining 40 parts MM0210-1 with 60 parts MM0210-2. The moisture content of this mixture was adjusted to 58% by the addition of water. The temperature of this mixture was maintained at about 110° F. to keep it fluid during the dipping operation.

Fat free chocolate coated ice cream bars were prepared by dipping commercial fat free ice cream novelty bars, Sealtest Free™, manufactured by Kraft General Foods, Inc. into the coating mixture. Prior to dipping, the fat free ice cream bars had been hardened on dry ice for several hours. After dipping, the bars were immediately removed from the coating mixture and suspended in air until the coating was fully frozen. The freezing time of the coating was approximately 1 minute. After the coating was frozen, the fat free chocolate coated ice cream bars were wrapped in plastic film and transferred to a 0° F. freezer.

The viscosity of the low fat chocolate coating mixture was determined using a Brookfield HVTD viscometer. Although the mixture tended to set up upon cooling without continuous agitation, it was found that the most uniform coat could be obtained when the viscosity was between 10,000 and 12,000 cP. The thickness of the coating is directly related to the viscosity of the coating mixture. At the indicated viscosity, the thickness of the coating on the fat free ice cream bars was 1-2 mm.

The gelling nature of the coating mixture was designed to keep the coating intact during the consumption of the ice cream bar. In addition, the formulation was designed so that the melting of the coating proceeded at a slower rate than that of the fat free ice cream. Those evaluating the product reported that the resulting mouthfeel was one which reflected the rapid melt of the ice cream and the rich, melted chocolate mouthfeel which lingered after the ice cream was dissoluted in the mouth.

EXAMPLE 11

Low fat frozen chocolate covered ice cream and peanut butter novelties were prepared using the coating mixture described in Example 10. Commercial vanilla fat free ice cream (Sealtest Free™) was cut into 6 cm squares approximately 1 cm thick. The fat free ice cream squares were frozen on dry ice and then coated on top with a low fat peanut spread. The low fat peanut spread had been prepared by mixing 2 parts of 85% reduced fat peanut butter with 1 part sugar syrup. The fat content of the low fat peanut spread was 5%.

Following another period of freezing on dry ice, the low fat peanut butter and ice cream centers were dipped in the low fat chocolate coating mixture. The squares were immediately removed from the coating mixture, and after the mixture had been partially frozen for about 30 seconds, the squares were wrapped in plastic film for storage at 0° F.

The frozen novelty products were evaluated for appearance, flavor and mouthfeel. The coating was uniform and about 1-2 mm in thickness. The cohesive nature of the coating kept it intact during eating. The flavor was rich peanut and chocolate. The texture of the coating was like that of fudge, but without the brittleness associated with full fat chocolate coatings.

The calorie and fat reduction of this product compared to a similar product formulated with full fat ingredients was substantial. The low fat products contained approximately 0.62% fat and 120 Kcal/100 g. A similar full fat product could contain as much as 19% fat and 250 Kcal/100 g.

EXAMPLE 12

Low fat chocolate baking chips were made according to the present invention using the formulation given below in Table 7.

TABLE 7

| Ingredient | Sample Number MM0106-1 Percent | Weight (g) |
|---|---|---|
| Stellar ™ | 4.5 | 45 |
| Paselli Sa-2 ™ | 13.5 | 135 |
| Sugar | 30.5 | 305 |
| Hydrogenated Fat | 2.0 | 20 |
| $TiO_2$ | 0.5 | 5 |
| Low Fat Cocoa | 10.0 | 100 |
| Water | 35.0 | 350 |

These ingredients were processed as described in Example 1. The product was allowed to completely firm up into a gel by overnight refrigeration at 35° F. The product was cut using a sharp knife into 4 mm cubes. The chips have a firm caramel texture. They are not sticky and do not require starch coating to keep them from adhering to one another.

The low fat chocolate chips were used in a fat free cookie recipe to make fat free chocolate chip cookies. Approximately 9 parts of cookie dough were used to 1 part of chips. The firmness of the chips was adequate for incorporation into the dough without significant smearing or deformation. The cookies were baked at 450° F. for about 6 minutes. During baking, the low fat chocolate chips melted, and those on the outside of the cookie tended to run out. After baking and before fully cooled, the chips were soft and moist, like melted chocolate. After cooling completely, the chips firmed up and became very chewy. The appearance of the cookies was acceptable.

EXAMPLE 13

Confection products were prepared in accordance with Example 1 which used a caramel powder as a flavor particle.

The confection products had the following formulations of Table 8.

TABLE 8

| Ingredient | Percent | Weight (lbs) |
|---|---|---|
| Sample Number MM0618-1 | | |
| Stellar[1] | 16 | 96 |
| Caramel Powder[4] | 0 | 0 |
| Sugar | 26 | 156 |
| MRC Solids[2] | 0 | 0 |
| Butteroil | 1 | 6 |
| $TiO_2$ | .3 | 1.8 |
| Cocoa[3] | 11 | 66 |
| Propionate | .05 | .3 |
| Sorbate | .05 | .3 |
| Water | 45.6 | 273.6 |
| Total | 100 | 600 |
| Sample Number MM0618-2 | | |
| Stellar[1] | 16 | 96 |
| Caramel Powder[4] | 11 | 66 |
| Sugar | 24 | 144 |
| MRC Solids[2] | 2 | 12 |
| Butteroil | 1 | 6 |
| $TiO_2$ | .3 | 1.8 |
| Cocoa[3] | 0 | 0 |
| Propionate | .05 | .3 |
| Sorbate | .05 | .3 |
| Water | 45.6 | 273.6 |
| Total | 100 | 600 |
| Sample Number MM0618-3 | | |
| Stellar[1] | 16 | 96 |
| Caramel Powder[4] | 5.5 | 33 |
| Sugar | 25 | 150 |
| MRC Solids[2] | 1 | 6 |
| Butteroil | 1 | 6 |
| $TiO_2$ | .3 | 1.8 |
| Cocoa[2] | 5.5 | 33 |
| Propionate | .05 | .3 |
| Sorbate | .05 | .3 |
| Water | 45.6 | 273.6 |
| Total | 100 | 600 |

[1]Stellar ™, manufactured by A. E. Staley Manufacturing Co., Decatur, IL
[2]MRC is a 9% slurry of microcrystalline cellulose which has been homogenized at 13,000 psig.
[3]Low Fat Cocoa Powder, Dutch Process, Type S, manufactured by Cocoa De Zoan b.v. Holland
[4]Caramel Powder Product 909, Kraft Food Ingredients, Memphis, TN All of the above samples of Table 8 had excellent organoleptic and melting properties. Sample No. MM0618-3 had the appearance and taste properties of milk chocolate. Sample No. MM0618-2 had the appearance and taste properties of a white chocolate.

What is claimed is:

1. A confection product having a continuous gel matrix which replaces the fat in the confection product, said confection product comprising between about 8 to about 22 percent of a gelling type maltodextrin having a D.E. in the range of from about 1 to below 20, between about 20% to about 32% of sugar, between about 5% to about 20% of flavor particles having a particle size of less than about 50 microns and added water, said added water being present at a level of from about 30% to about 60%, said confection product being a continuous gelled sugar solution having said flavor particles embedded therein and said confection product having a firmness at freezing temperatures, room temperatures and when melted which is similar to that of full fat milk chocolate.

2. A confection in accordance with claim 1 wherein the fat level is less than about 15%.

3. A confection in accordance with claim 1 wherein the fat level is less than about 1%.

4. A confection in accordance with claim 1 wherein said maltodextrin is present at a level of from about 12% to about 17%.

5. A confection in accordance with claim 1 wherein said flavor particle has less than about 1% fat.

6. A confection in accordance with claim 1 wherein said flavor particle has from about 1% to about 20% fat.

7. A confection in accordance with claim 1 wherein at least part of said sugar is replaced by a nutritive sugar selected from the group consisting of glucose, corn syrup, high fructose corn syrup and fructose.

8. A confection in accordance with claim 1 wherein all or part of said sugar is replaced by polydextrose and the sweetening effect of said displaced sugar is provided by one or more artificial sweeteners.

9. A confection in accordance with claim 1 wherein a fat is present in said composition at a level of from about 1% to about 10%.

10. A confection in accordance with claim 9 wherein said fat is cocoa butter.

11. A confection in accordance with claim 1 wherein a color enhancing substance is present in said composition.

12. A confection in accordance with claim 11 wherein said color enhancing substance is selected from the group consisting of titanium dioxide and tricalcium citrate which is present at a level of from about 0.1% to about 0.5%.

13. A confection in accordance with claim 1 wherein tricalcium citrate is present at a level of from about 8% to about 12% to restrict the melting properties of said confection.

14. A confection in accordance with claim 1 wherein the water to sugar ratio is from about 1:1 to about 3:1.

15. A confection in accordance with claim 1 wherein said flavor particle has a particle size in the range of from about 1 micron to about 50 microns.

16. A confection in accordance with claim 1 wherein said flavor particle is cocoa.

17. A confection in accordance with claim 1 wherein said flavor particle is caramelized sugar.

18. A method for manufacture of a confection product, the method comprising:

(a) providing a mixture of a maltodextrin having a D.E. in the range of from about 1 to below 20, sugar and added water, said maltodextrin being present in said confection product at a level of between about 8 and about 22 percent of the confection product, said added water being present in said mixture at a level of between about 30% to about 60% of the confection product, said sugar being present at a level of from about 20% to about 32%;

(b) heating said mixture to an elevated temperature of from about 180° F. to about 200° F.;

(c) holding said mixture at said elevated temperature for a period of from about 10 minutes to about 30 minutes;

(d) adding a flavor particle having a particle size of less than about 50 microns to said mixture and agitating said mixture for a time sufficient to disperse said flavor particles homogeneously in said mixture, said flavor particle being added at a level to provide from about 5% to about 20% of said flavor particle in said mixture; and (e) cooling said mixture to provide a confection product which is an aqueous gelled matrix containing embedded flavor particles, said confection product having a firmness at freezing temperatures, room temperature and when melted which is similar to that of full fat milk chocolate.

19. A method in accordance with claim 18 wherein said mixture is cooled to a temperature of from about 150° F. to about 160° F. prior to adding said flavor particle.

20. A method in accordance with claim 18 wherein the fat level is less than about 15%.

21. A method in accordance with claim 18 wherein the fat level is less than about 1%.

22. A method in accordance with claim 18 wherein said maltodextrin is present at a level of from about 12% to about 17%.

23. A method in accordance with claim 18 wherein said flavor particle is cocoa having less than about 1% fat.

24. A method in accordance with claim 18 wherein said flavor particle is cocoa having from about 1% to about 20% fat.

25. A method in accordance with claim 18 wherein at least part of said sugar is replaced by a nutritive sugar selected from the group consisting of glucose, corn syrup, high fructose corn syrup and fructose.

26. A method in accordance with claim 18 wherein all or part of said sugar is replaced by polydextrose and the sweetening effect of said displaced sugar is provided by one or more artificial sweeteners.

27. A method in accordance with claim 18 wherein a fat is present in said composition at a level of from about 1% to about 10%.

28. A method in accordance with claim 27 wherein said fat is cocoa butter.

29. A method in accordance with claim 18 wherein a color enhancing substance is present in said composition.

30. A method in accordance with claim 29 wherein said color enhancing substance is selected from the group consisting of titanium dioxide and tricalcium citrate which is present at a level of from about 0.1% to about 0.5%.

31. A method in accordance with claim 30 wherein said tricalcium citrate is present at a level of from about 8% to about 12% to restrict the melting properties of said confection.

32. A method in accordance with claim 18 wherein the water to sugar ratio is from about 1:1 to about 3:1.

33. A method in accordance with claim 18 wherein said flavor particle has a particle size in the range of from about 1 micron to about 50 microns.

34. A method in accordance with claim 18 wherein said flavor particle is caramelized cocoa.

35. A method in accordance with claim 18 wherein said flavor particle is caramelized sugar.

* * * * *